June 9, 1925.  
R. F. MACFIE  
1,540,853  
MACHINE FOR THE TREATMENT OF VACCINE  
Filed June 4, 1923  
2 Sheets-Sheet 1
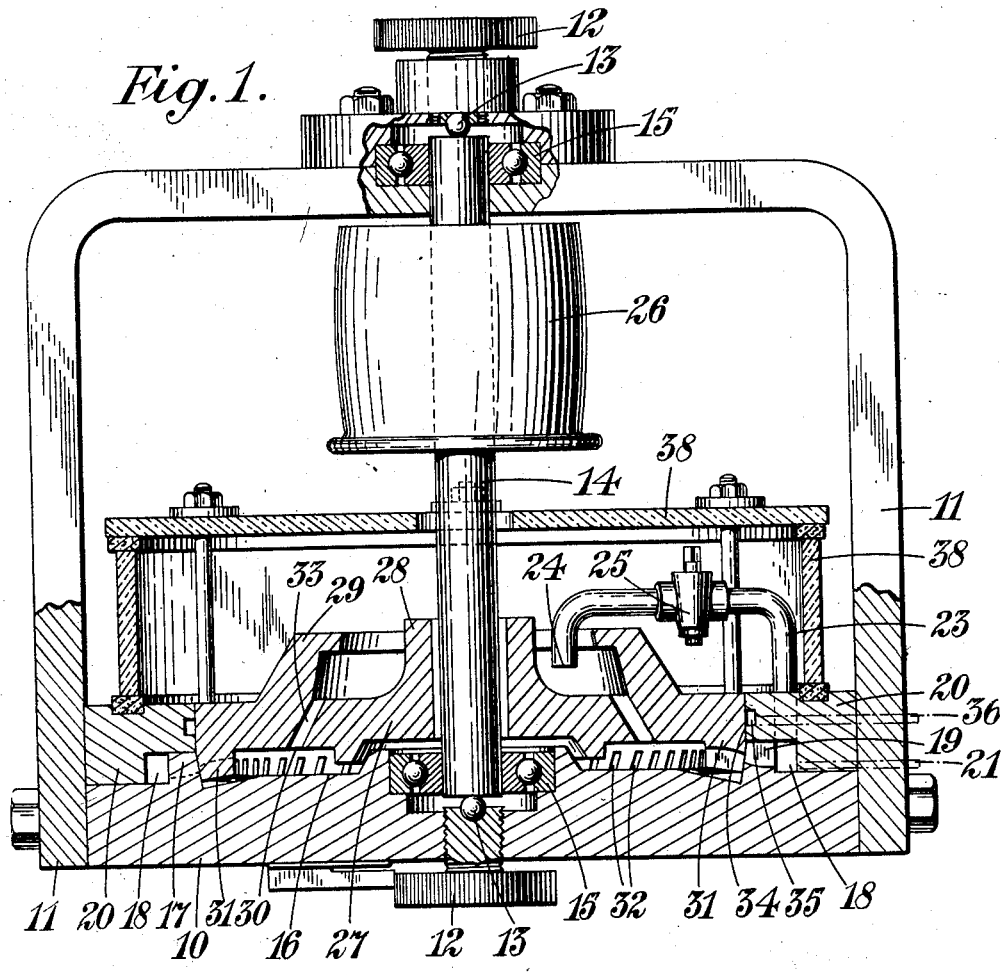

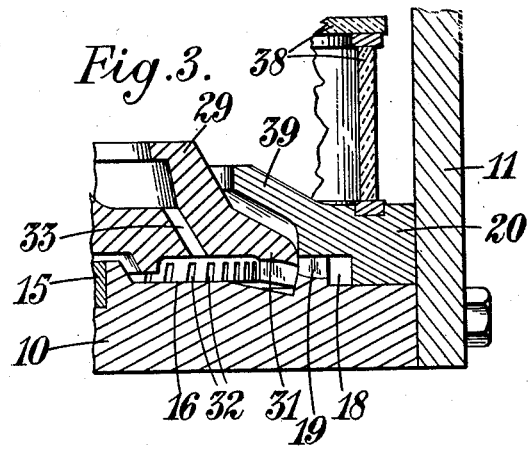
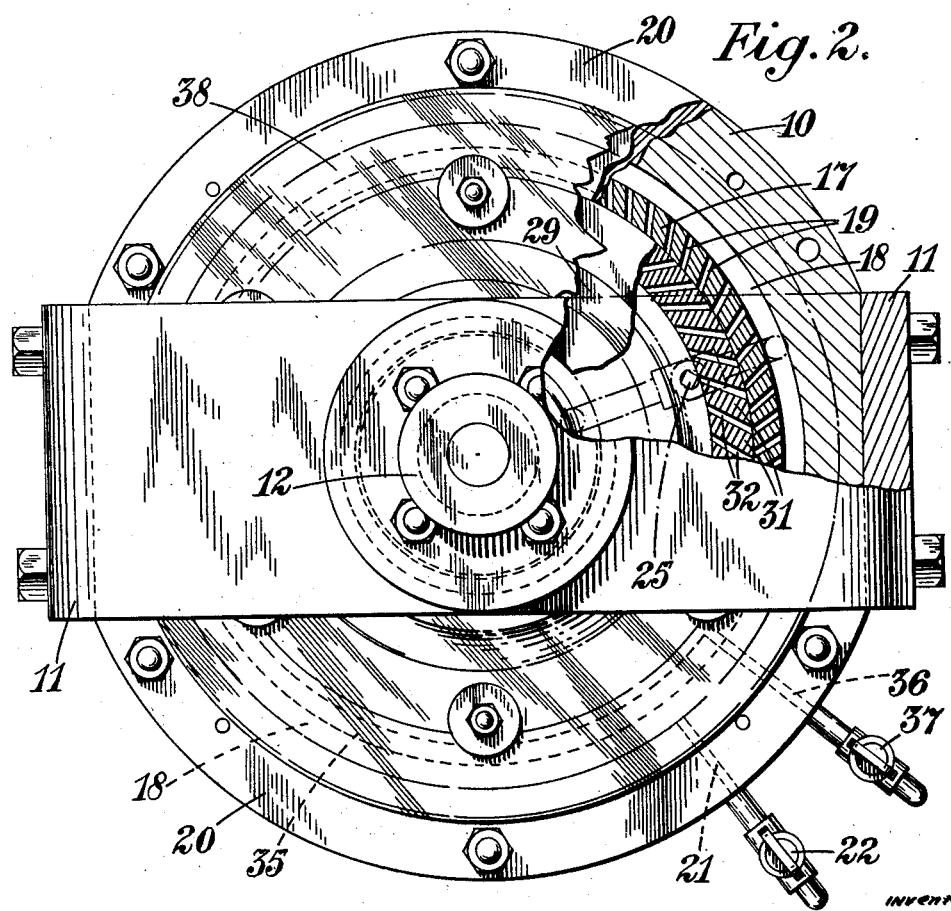

Patented June 9, 1925.

1,540,853

UNITED STATES PATENT OFFICE.

ROBERT FRANCIS MACFIE, OF LONDON, ENGLAND, ASSIGNOR TO NUTRIMENT LIMITED, OF LONDON, ENGLAND, A BRITISH COMPANY.

MACHINE FOR THE TREATMENT OF VACCINE.

Application filed June 4, 1923. Serial No. 643,480.

*To all whom it may concern:*

Be it known that I, ROBERT FRANCIS MACFIE, a citizen of the United States of America, residing in London, England, have invented certain new and useful Improvements in Machines for the Treatment of Vaccine, of which the following is a specification.

This invention has for its object to provide an improved machine for the treatment of vaccine. In the preparation of vaccines, it is desirable that the bacteria should be detoxicated, and for this purpose it is necessary that the skin or covering should be burst, broken or otherwise punctured, or that the bacteria should be crushed, and the object of this invention is to provide a machine for the treatment of a liquid wherein the bacteria are in suspension in the usual manner whereby this operation shall be more effectively performed than has hitherto been possible.

According to this invention, apparatus for the purpose above set forth comprises two elements, for example a stator and a rotor, arranged to be movable relatively one to the other at a high speed, each element being provided with passages which in said relative movement, are brought into and out from register with one another, and means for forcing the liquid containing the bacteria through said passages, whereby it is violently agitated, and the bacteria are punctured or crushed.

In a preferred form of this invention, the apparatus comprises a rotor having a peripheral flange provided with saw cuts or like passages through it, a stator also having a flange provided with similar passages, these two parts being so disposed that the ends of the saw-cuts cross one another during rotation of the rotor to provide intermittently communication from the interior of the rotor to the stator, and means for circulating the liquid into the passages.

The liquid is discharged centrifugally from the rotor into the stator, and the chamber in the stator receiving the liquid may be closed, and provided with a pipe communication so that the pressure exerted on the liquid in the stator causes it to be forced through this pipe back and delivered into the rotor, so that a continuous circulation is maintained.

According to another feature of this invention, a valve of any convenient construction may be provided on this pipe to control the rate of the said circulation, as in some instances a better result may be obtained by permitting the circulation to be only slow.

In the accompanying drawings—

Figure 1 is a central sectional view of the apparatus according to this invention;

Figure 2 is a plan of Figure 1 with parts broken away; and

Figure 3 is a detail view showing a modified construction.

Like reference characters indicate like parts throughout the drawings.

Referring to Figures 1 and 2, the apparatus comprises a circular plate 10 which constitutes the stator of the machine, and a bridge-piece or bracket 11 is secured on it in any convenient manner so as to extend diametrically across it. Bearings for a vertical shaft are provided centrally in the plate 10 and bracket 11. As illustrated, a thrust-bearing is provided at each end of the shaft by means of an adjustable screw 12 carrying a hardened steel ball 13 situated axially on it and adapted to engage the rotor shaft 14 on the central line thereof. The radial bearings 15 serve to locate the shaft. Around the bearings in the stator-plate 10 there is formed an annular recess 16 so as to provide an upstanding wall 17 from the face of the stator 10. An annular channel or recess 18 is formed on the stator outside the wall or flange 17, so that the said wall 17 stands up as a circular ridge from the stator. This ridge 17 is provided with a large number of saw-cuts 19, each extending downwards from its upper surface to near the bottom of the ridge, and they are preferably as narrow as they can conveniently be made and are spaced as closely together as is practicable. Thus, for example, these saw-cuts may be about one-sixteenth of an inch broad with a space of about one-eighth of an inch between them.

Furthermore, these saw-cuts in plan are inclined at an angle of, say, 30 degrees to the radial lines of the stator whereon they lie, the cuts sloping forward from their inner ends in the direction of rotation of the rotor. Preferably also they are not vertical, but are sloped away from the vertical at an angle of, say, 10 degrees.

The radially-inner ends of these saw-cuts open on to the inner face of the ridge 17, and this face is sloped downwards so that it constitutes a part of the surface of a cone whereof the apex lies on the axis of and below the rotor. The outer ends of the saw-cuts 19 open on to the annular channel 18 aforesaid, and this channel is closed by a top-plate 20. This top-plate may be of any convenient shape, and as illustrated in Figure 1, it constitutes both the outer wall and the top of the channel 18.

A suitable passage 21, shown in Figure 2, and also shown diagrammatically in Figure 1, provides communication from the channel 18 to the outside of the apparatus, where it is fitted with a suitable cock 22; this opening serves as a drain for the channel 18. Communication from this channel 18 is also provided by a pipe-connection 23 which extends upwards from the channel and is bent over towards the centre of the stator with its upper end 24 conveniently near the centre. A stop-cock or valve 25 of any suitable construction is provided in this pipe.

The rotor of this apparatus is mounted on the shaft 14 as aforesaid, which also carries a belt-pulley 26 or other convenient means for rotating the shaft at a high speed. The rotor 27 is substantially disc-shaped, but is provided with a central boss 28 whereby it is keyed or otherwise secured to this shaft 14, and is provided with an upstanding and overhanging flange 29. The lower face 30 of the rotor is spaced away from the opposed face of the stator so as to provide a space between them. The rotor is also provided with a downwardly directed flange 31 which fits within the recess formed by the flange 17 on the stator, and is correspondingly tapered. The flange 31 is provided with saw-cuts 32 similar to those in the stator, but the sawcuts in the rotor are inclined backwardly from their radially inner ends with respect to the direction of rotation of the rotor, as shown in Figure 2, and in elevation they are inclined to the vertical, as shown in Figure 1, at an angle of, say, 10 degrees in the opposite direction to that in which the stator saw-cuts are inclined, as above stated. The depths of the saw-cuts in the stator and rotor are so proportioned that they overlap one another vertically so that during the rotation of the rotor, the outer ends of the saw-cuts 32 are traversed across the inner ends of the saw-cuts 19 on the stator, thereby providing intermittent communication from the inner space between the stator and rotor to the outer annular space 18 aforesaid. The open end 24 of the pipe-connection 23 aforesaid opens into the interior of the rotor, and passages 33 provide communication between the upper and lower sides of the rotor as shown in Figure 1.

In the operation of this machine, the rotor is set in rotation, and a quantity of liquid containing the bacteria to be treated is introduced into the rotor. It passes downwards through the passages 33 into the space between the stator and rotor, and under the action of centrifugal force, it is delivered outwards through the saw-cuts 32 and 19 by the intermittent communication established between them during rotation. Sufficient pressure is established in the channel 18 by the centrifugal force to cause the liquid to rise in the pipe 23, and be delivered from the open end 24 into the rotor so that a continuous circulation is effected. By opening or closing the valve 25 to a greater or less extent, the rate of this circulation can be controlled.

In a construction of apparatus according to this invention which has proved satisfactory, the rotor is about 11 centimetres in diameter, and is driven at a speed of about three-thousand revolutions per minute. The stator has eighty saw-cuts 19 in it, and the rotor has seventy saw-cuts 32, these saw-cuts being of the dimensions above set forth. Obviously, however, the machine may be made of any desired size and run at any desired speed. Generally speaking, the higher the speed at which the rotor can be run, the more efficient is the working of the machine, as the agitation which the liquid receives is governed mainly by the smallness of the saw-cuts and the high speed of the rotor.

In order to prevent leakage of the liquid which is being treated, through the space between the rotor and stator, these two parts are preferably provided with co-operating cylindrical surfaces as shown at 34, and a channel or groove 35 is provided in these faces to trap any liquid leaking between them. A drain 36 with a stop-cock or valve 37 is used to draw off such leakage. There may also be provided a glass or like shield 38 mounted above the rotor so as to prevent loss of liquid by splashing.

Instead of the surfaces 34, the construction illustrated in Figure 3 may be used. In this case the part 20 which forms the closure for the outer wall and top of the channel 18 is extended inwards towards the centre of the rotor and upwards as at 39 to such a height as to provide a hydrostatic pressure which will balance the pressure due to centrifugal effect of any liquid leaking upwards through the outer periphery of the rotor and the inner surface of the stator.

It will be obvious that many modifications may be made in the mechanical details of construction of the apparatus, and all such modifications are held to lie within the scope of this invention.

What I claim as my invention and desire to secure by Letters Patent is:—

1. In apparatus for the treatment of solid particles in suspension in a liquid, the combination of two concentric elements fitting closely together, means for rotating the inner element relatively to the outer element at a high speed, passages in each of said elements extending from the radially inner face to the radially outer face thereof and inclined relatively to radial lines passing through their inner ends, said passages being so arranged as to be brought by the relative rotation of the elements into and out from register with one another, means for supplying the liquid mixture to the inner element whence it is discharged centrifugally at a high speed through the passages aforesaid of the inner element intermittently to the passages aforesaid of the outer element, and means for circulating the liquid repeatedly to the said inner element, substantially as described.

2. In a machine for the treatment of vaccine and bacteria in suspension in a liquid, the combination of a plate, a circularly disposed flange upstanding on the upper face thereof, openings extending through said flange from the inner to the outer face thereof, an annular member surrounding said flange and providing a chamber between it and the flange wherewith said openings communicate, a rotatable shaft mounted coaxially with said flange, means for rotating said shaft, a rotor on said shaft, a circularly disposed wall on said rotor fitting against the inner surface of the flange on said plate, openings extending through said wall in the same plane as the openings in the said flange, means for supplying the liquid to be treated to the rotor inside the wall thereon, and means for withdrawing the liquid from the chamber aforesaid.

3. In a machine for the treatment of vaccine and bacteria in suspension in a liquid, the combination of a plate, a circularly disposed flange upstanding on the upper face thereof, substantially radial openings extending through said flange, a closure member surrounding said flange and providing a chamber between it and the flange wherewith the said openings communicate, a rotatable shaft mounted coaxially with the said flange, means for rotating said shaft, a rotor on said shaft spaced away upwardly from said plate, a circularly disposed wall depending from said rotor and fitting against the inner surface of the said flange, substantially radial openings extending through said wall in the same horizontal plane as the openings in the said flange, means for circulating the liquid to be treated through the said rotor, the said passages and the said chamber.

4. In a machine for the treatment of vaccine and bacteria in suspension in a liquid, the combination of a disc-like rotor formed with a peripheral flange, a disc-like stator facing said rotor and spaced away therefrom and provided with a flange fitting closely outside the said flange on the rotor, substantially radial saw-cuts in each of said flanges, means for supplying liquid to the space between the opposed faces of the rotor and the stator, a chamber in said stator whereto the liquid to be treated is delivered through said saw-cuts, and a pipe connection providing a circulation path for the liquid from the said chamber back to said rotor.

5. In a machine for the treatment of vaccine and bacteria in suspension in a liquid, the combination of a disc-like rotor formed with a peripheral flange, a disc-like stator facing said rotor and spaced away therefrom and provided with a flange fitting closely outside the said flange on the rotor, substantially radial saw-cuts in each of said flanges, means for supplying liquid to the space between the opposed faces of the rotor and stator, a chamber in said stator whereto the liquid to be treated is delivered through said saw-cuts, a pipe connection providing a circulation path from the liquid from the said chamber back to said rotor, and a controlling valve on said pipe connection.

6. In a machine for the treatment of vaccine and bacteria in suspension in a liquid, the combination of a disc-like rotor, a depending peripheral flange thereon, a disc-like stator facing said rotor but spaced away therefrom and provided with a flange fitting closely outside the flange on the said rotor, substantially radial saw-cuts in each of said flanges extending from the edge thereof in opposite directions from parallelism with the axis of rotation of the rotor, means for supplying liquid to the space between the opposed faces of the rotor and stator, a chamber wherewith the radially outer ends of the saw cuts in the flange on the stator communicate, and means for circulating the liquid to be treated through said rotor, said saw cuts and said chamber.

7. In a machine for the treatment of vaccine and bacteria in suspension in a liquid, the combination of a disc-like rotor, a depending peripheral flange thereon, saw-cuts extending from the inner to the outer face of said flange, inclined relatively to radial lines backwardly from their inner ends in the direction of rotation, a disc-like stator facing said rotor and spaced away therefrom, an upwardly-directed flange on said stator fitting closely to the outside surface of the flange on said rotor, saw-cuts extending through the flange in said rotor from the inner to the outer face thereof and inclined forwardly in the direction of rotation from their inner ends relatively to radial lines passing through said inner ends, a chamber wherewith the outer ends of said saw cuts communicate, and means for circulating the liquid to be treated through said rotor, said saw cuts and said chamber.

In testimony whereof I affix my signature.

ROBERT FRANCIS MACFIE.